United States Patent [19]

Baur et al.

[11] Patent Number: 4,708,797
[45] Date of Patent: Nov. 24, 1987

[54] ROTARY DISC FILTER ELEMENT

[75] Inventors: Rolf Baur, Heubach-Lautern; Bernhard Gruber, Waldstetten, both of Fed. Rep. of Germany

[73] Assignee: Anton Steinecker Maschinenfabrick GmbH, Fed. Rep. of Germany

[21] Appl. No.: 510,417

[22] Filed: Jul. 1, 1983

[30] Foreign Application Priority Data

Aug. 31, 1982 [DE] Fed. Rep. of Germany ....... 3232354

[51] Int. Cl.⁴ ............................................. B01D 33/24
[52] U.S. Cl. .................................... 210/330; 210/344; 210/345
[58] Field of Search .............. 210/344, 345, 347, 487, 210/489, 493.1, 499, 324, 330, 331

[56] References Cited

U.S. PATENT DOCUMENTS

| 3,319,794 | 5/1967 | Gross | 210/344 X |
| 3,387,711 | 6/1968 | Rickert | 210/344 |
| 3,398,832 | 8/1968 | Mueller | 210/344 X |
| 3,931,017 | 1/1976 | Schulte et al. | 210/345 X |
| 3,948,778 | 4/1976 | Muller | 210/345 X |
| 4,201,670 | 5/1980 | Baur | 210/778 |

Primary Examiner—Richard V. Fisher
Assistant Examiner—W. Gary Jones
Attorney, Agent, or Firm—Learman & McCulloch

[57] ABSTRACT

A rotary disc filter element having a large surface area for tank filters, such rotary disc filter element being composed of a hub, a circular bottom plate mounted thereon, a filter mesh clamped above it, and a supporting mesh arranged between the bottom plate and the filter mesh. The bottom plate is stiffened by corrugations which extend substantially radially and coaxially of the hub.

12 Claims, 2 Drawing Figures

ROTARY DISC FILTER ELEMENT

BACKGROUND OF THE INVENTION

The invention relates to a rotary disc filter element having a large surface area for tank filters, such filter element having a hub, a circular bottom plate mounted thereon, a filter mesh clamped above it, and a supporting mesh arranged between the bottom plate and the filter mesh.

Rotary disc filter elements having a large surface area filtering means in compression-loaded tank filters are described in U.S. Pat. No. 4,201,670 or the equivalent German Offenlegungsschrift No. 27 05 046. The individual rotary disc filter elements are arranged on a central shaft and clamped firmly together so that they are sealed. All the rotary disc filter elements together form a filter unit. The purpose of rotary disc filter elements is to eliminate impurities from unfiltered material and to draw off the clean filtrate. The distance between the rotary disc filter elements is determined by the height of the tank.

The deposited filtration residues settle on the upper filter mesh of the rotary disc filter elements and form the filter cake. As the total filtration time increases the filter cake grows and becomes thicker. The height of the total filter cake which is formed is determined by the distance between two rotary disc filter elements standing one above the other. In order to remove the filter cake from the disc filter elements the filter unit is set in rotation. The filter cake is removed from the rotary disc filter elements by the centrifugal force.

The filter cake has a very considerable weight. It rests on the upper surface of each rotary disc filter element. In the past, in order to prevent twisting, bowing or bending of the individual rotary disc filter elements under the load of the filter cake the rotary disc filter elements have been supported on the underlying filter element by means of supporting feet. These supporting feet are arranged evenly spaced over the whole outer periphery of each rotary disc filter element.

It is, however, a disadvantage of this method of support that when material to be filtered is applied to the filter mesh and the filter unit is simultaneously rotated slowly these feet cause turbulence to be set up in the region of each supporting foot so that washing off occurs or no primary flooding occurs on the filter mesh in the region of the turbulence. When the actual filtration begins poor filtrate or even unfiltered material enters the filtrate at these points and contaminates it. A constant, effective free filter surface and thus an even hourly output and total capacity are only assured from the beginning over the whole duration of the filtration charge by an even build-up of the filter cake. Washed-off or clean points quickly block the mesh and thus reduce the free effective filter surface.

A further, disadvantage of the supporting feet occurs when the disc filter elements are being cleaned. The supporting feet impede the filter cake being thrown off by the centrifugal force and prevent the pieces of filter cake from slipping off freely. More or less large pieces are retained by the supporting feet. This results in an imbalance in the rotating filter unit and consequently not inconsiderable damage to the machine and the structure. With more highly viscous filter cakes it can even happen that the supporting feet are bent outwards or completely broken off. It is not rare, despite a long period of rotation, for the filter elements not to be one hundred percent cleaned but residues of filter cake are still located in the region of the feet.

SUMMARY OF THE INVENTION

An object of the present invention is to provide a rotary disc filter element having a large surface area which by simple means ensures a high degree of stability and at the same time improved delivery of the material to be filtered and satisfactory cleaning without disruption, as well as an efficient method of operating such a rotary disc filter element.

This object is achieved according to the invention by stiffening the bottom plate.

The stiffening is advantageously formed by corrugations which run substantially radially and coaxially with the central axis of the filtering tank and hub of bottom plate.

This feature according to the invention has the crucial advantage over known rotary disc filter elements that there are no disruptive supporting feet. The washing off caused by the feet is prevented and difficulties in cleaning do not occur.

In a further advantageous embodiment the bottom plate is deep drawn like a border in the region of the hub of the central ring and a coaxial corrugation is arranged at least in the edge region of the outer periphery of the bottom plate, and the radial corrugations extend from the deep drawn border on the hub into the coaxial corrugation located on the outer periphery of the bottom plate. The radial corrugations are arranged evenly and with the same angular spacing of 15° to 60°, preferably 30°, over the whole surface of the bottom plate. The radial corrugations run down towards the hub, while the actual bottom plate runs completely horizontally.

In this way the problem of completely empty running of a rotary disc filter element is solved.

In one inventive embodiment the free space to receive the filter cake, i.e., the filling space, is adjustable as desired by arranging a spacer ring between two rotary disc filter elements of large surface area arranged one above the other.

This achieves the object of appropriately varying the filling space and adapting the total filter capacity to the filter medium. This results in greater possibilities for use of the machine through adaptation based on the product or the type of filtration. In this way the filtering costs are reduced, thus increasing the overall profitability. This possibility was not available in arrangements according to the prior art because the filling space was strictly predetermined by the height of the supporting feet and was therefore fixed and replacement of the whole clamping unit for the filter mesh was necessary in order to alter the filling space. This gave rise to quite considerable costs.

With a rotary disc filter element of the type referred to a method according to the invention is characterised in that during flushing back the coaxial corrugation in the edge region of the outer periphery of the bottom plate forms a free flow channel which is connected to the substantially radial corrugation and the border-like recess.

Around the hub this border-like recess in the bottom plate forms a filtrate collecting channel for draining off the filtrate through discharge bores arranged evenly in the hub. The radial recesses form a laminar discharge system for draining off the filtrate.

This drainage system ensures an even drainage of filtrate within a rotary disc filter element. Because of this filtration occurs over the whole surface of the rotary disc filter element of the filter cake which has built up, so that the filter cake also builds up evenly over the whole surface. Thus by means of this drainage flow the object of producing an even, build-up of the filter cake is achieved.

On the other hand this delivery and discharge system also solves the problem of removing deposits of filtering aids between the filter mesh and the bottom plate. The filtering aids which are forced through the filter mesh when the primary flooding is introduced rest on the bottom plate during the whole filtration period and during the centrifugal cleaning are spun off into the coaxial corrugation on the outer periphery of the bottom plate. There they are raised and broken up by the flushing back fluid flowing in through the radial corrugations so that they are caught up by the following rinsing water in the filtration direction and are rinsed off, that is to say washed free.

The apparatus according to the invention is a prerequisite for the problem-solving method of preventing deposits of filtering aids between the bottom plate and the filter mesh. In apparatus according to the prior art such deposits have almost always led to the formation of a bulge in the region of the filter mesh clamping arrangement in the edge region of the filter mesh. Despite intensive efforts by the experts in this field no one succeeded in finding a method of solving the problem. This problem is solved by the method described here.

DESCRIPTION OF THE DRAWINGS

Advantageous developments and embodiments of the invention are disclosed in the following description and in the accompanying drawings, in which.

DETAILED DESCRIPTION

Figure 1:
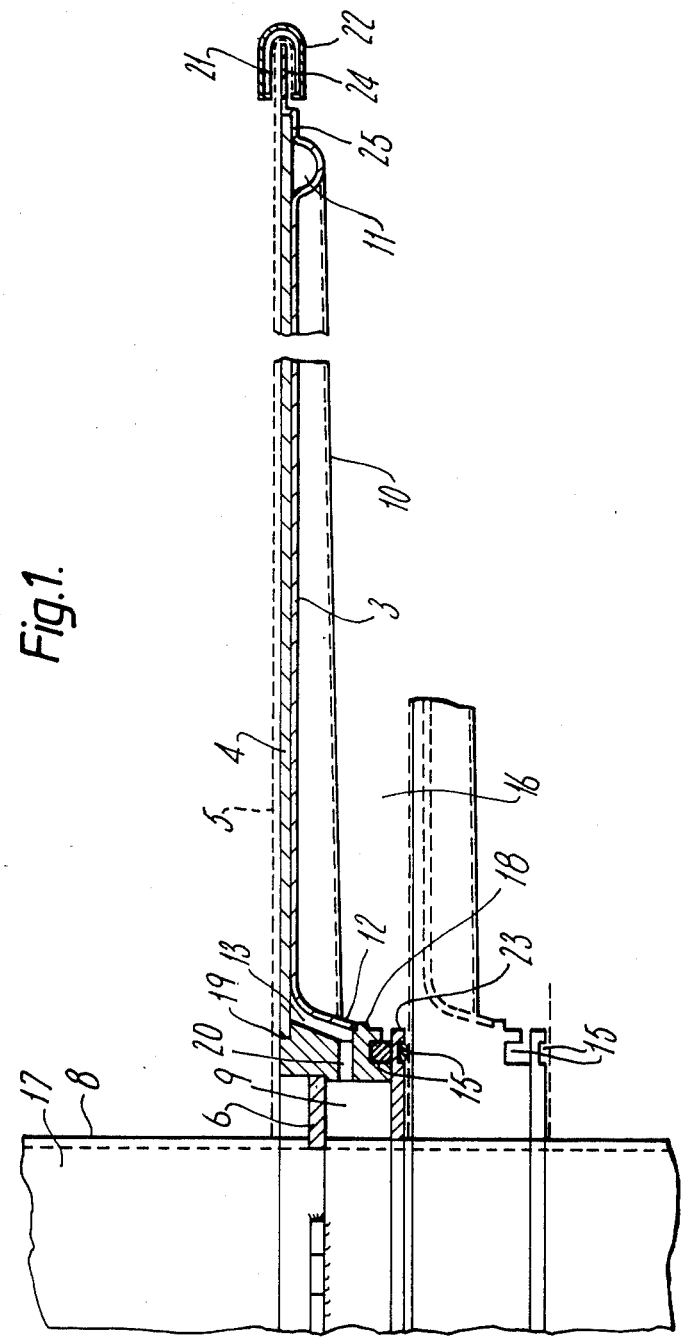
FIG. 1 is a sectional, fragmentary view of two rotary disc filter elements arranged one above the other.
Figure 2:
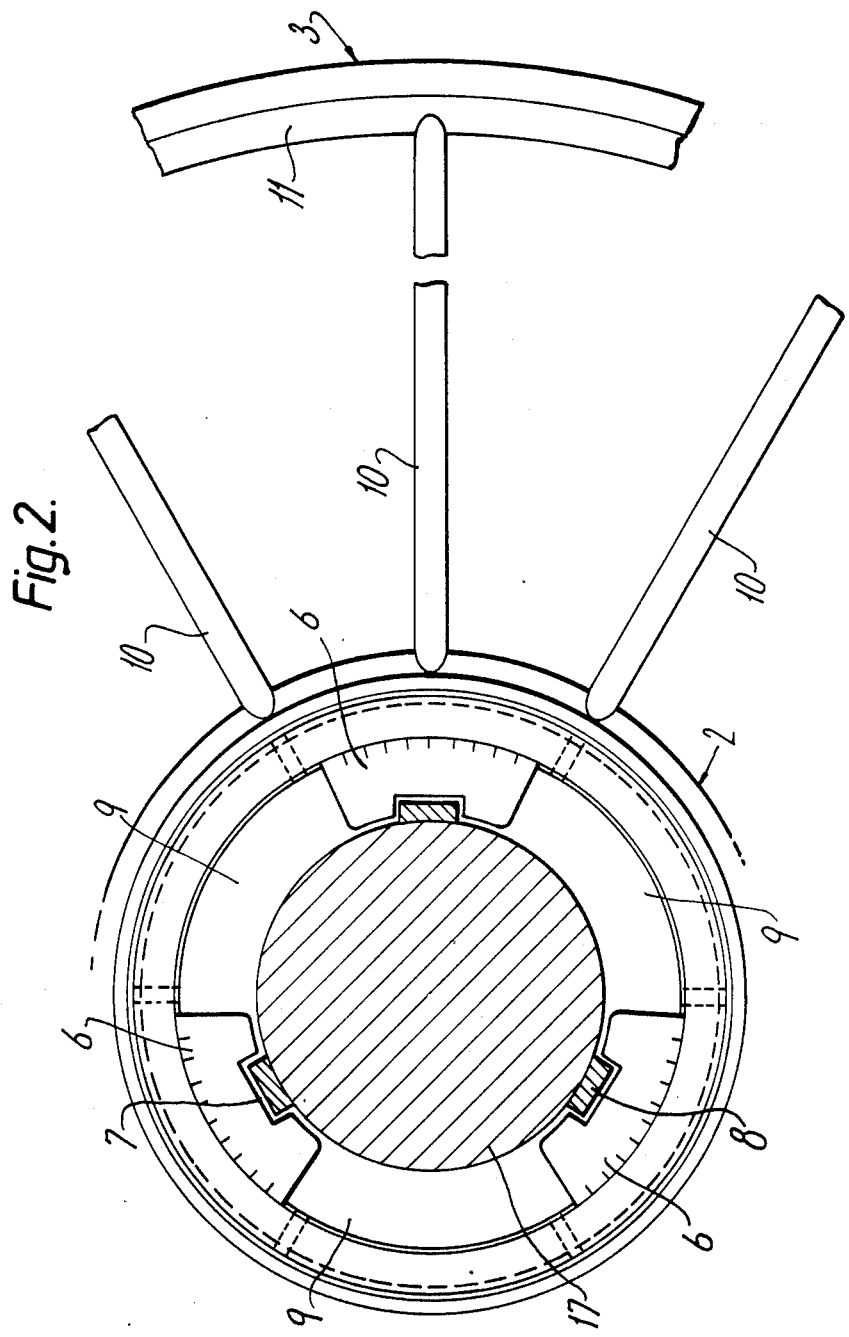
FIG. 2 is a fragmentary view partly in plan and partly in section of a rotary disc filter element.

Rotary disc filter elements 1 according to the invention are adapted for use in filter tanks of known construction, and each is composed of a hub 2, a bottom plate 3, a supporting mesh 4, and a filter mesh 5. A plurality of rotary disc filter elements arranged one above the other on a central shaft 17 form a filter unit. The filter unit is clamped and sealed over known apparatus, not shown.

A disc-like bottom plate 3 is mounted on a hub 2. On this rests a supporting mesh 4 above which a filter mesh 5 is clamped. Thesupporting mesh 4 and the filter mesh 5 have a central hole which corresponds to the diameter of a bore in the hub 2 and is also arranged in this region.

On the hub 2 a deep drawn border 12 of the bottom plate 3 is welded onto a lower projection 18 which projects axially over the other periphery of the hub 2. The supporting mesh 4 rests on an upper projection 19 of the hub 2. The upper projection 19 is radially inward of the lower projection 18. This results in a free annular space which forms a collecting channel 13 between the hub 2 and the deep drawn border 12. Horizontal bores 20 in the hub 2, evenly spaced around the hub 2, connect the collecting channel 13 to a filtrate drainage channel 9.

The drainage channel 9 is formed in such a way that the diameter of the bore in the hub 2 is greater than the external diameter of the central shaft 17. In order to center the hub 2 on the central shaft 17 three spacers 6 of equal dimensions are welded in the internal bore of the hub 2. A spline 8 of the central shaft 17 engages in a guide groove 7 which is milled into each spacer 6.

The bottom plate 3 extends horizontally towards the deep drawn border 12 as far as the radially outer edge thereof. Twelve radial corrugations 10 are deep drawn in this bottom plate 3 and spaced from one another at an angle of 30°. A coaxial corrugation 11 is located near the outer edge. The coaxial corrugation 11 is connected to the collecting channel 13 by the twelve radial corrugations 10. The radial corrugations 10 are downwardly inclined from the coaxial corrugation 11 to the collecting channel 13.

On its outer periphery the bottom plate is at the same level radially inward of the coaxial corrugaticn 11, but radially outward of the coaxial corrugation 11 it extends approximately 10 mm higher. Then it is extended upwards by the height of the supporting mesh 4 and then, after a further bend, it is horizontal again. In this way a bearing surface 25 for the supporting mesh 4 is formed radially inward of an extension 24.

As can be seen in FIG. 1 the filling space 16 is formed by the space between the filter mesh 5 of the lower rotary disc filter element and the underside of the bottom plate 3 of the next rotary disc filter element.

The radially inner seal between the rotary disc filter elements is produced on the hub. In each case a groove in which an annular dovetail seal 15 is laid is located on the underside.

To seal the radially outer edge of a rotary disc filter element an approximately U-shaped sealing ring 21 is pushed over the filter mesh 5 which is bent around the peripheral edge of the bottom plate 3. A clamping ring 22 which is also approximately U-shaped presses the sealing ring 21 around the outer periphery of the bottom plate so that it is fluid-tight.

The apparatus according to the invention functions as follows:

Before the filtration begins an initial or primary flooding is applied to the filter mesh 5. This primary flooding consists of a filtering aid such as diatomaceous earth, pearlite, activated carbon, or any other granulate or the like. With this primary flooding a protective layer is laid on the filter mesh 5 in order to prevent filtration residues from becoming embedded in the filter mesh 5·and blocking it.

The f,iltering aid is added to a carrier fluid, for example water, and pumped "in circulation" through the tank filter. This suspension consisting of carrier fluid and filtering aid enters the filling space 16. The carrier fluid runs through the filter mesh 5 and the supporting mesh 4 and flows over the bottom plate 3 and the corrugations 10 and 11 located therein to the collecting channel 13 and thence flows through the bores 20 in the hub 2 into the filtrate drainage channel. The filtering aid settles in an even layer on the filter mesh 5. The supporting feet which are neces sary in the prior art are omitted here because of the stiffening of the bottom plate by the radial corrugations 10, and so no turbulence occurs in the region of the flooding surface which in prior art constructions led to washing off in the flooding layer and thus to a primary flooding of uneven thickness.

The grooves formed in the upper surface of the bottom plate 3 by the corrugations mean that corresponding to the even drainage the fluid passes evenly through the filter mesh 5 at each point on the filter mesh. As a result an even sedimentation also occurs on the upper surface of the filter mesh on the disc filter elements.

According to the invention an even build-up of the filter cake maintains the optimum free filter surface over the whole filtration period until the filling space 16 is exhausted. Naturally, and in known manner, an optimum even dosage of filtering aids over the whole filtration cycle is predetermined. It should merely be mentioned that the addition of filtering aids is unnecessary in those cases where the unfiltered material already contains sufficient substances to loosen the filter cake.

After the filtration is ended the filter cake (the residue) is spun off by the centrifugal force of the rotating disc filter elements. Components which cause disruption in the prior art do not hinder the apparatus according to the invention. The solid materials are removed from the filter mesh 5 in a very short time. The next stage is flushing back. Any particles still adhering are freed and washed away. Flushing back takes place against the direction of filtration. The alternating cleaning methods, water and centrifugal force, force the mixture of water and diatomaceous earth between the bottom plate and the fine mesh. Particles of diatomaceous earth are thrown onto the outer wall of the element during the rotation which follows.

Since, as is known in the art, on the one hand the particle size distribution in the filtering aid is subject to great fluctuations and on the other hand the pore size of the filter mesh 5 is greater than a majority of the filtering aid particles, a greater or lesser quantity of filtering aid particles will pass through the filter mesh 5 until the "bridge formation" which produces the filtering effect takes place. As a consequence of their relatively high specific gravity these particles settle on the supporting mesh 4 and the upper surface of the bottom plate 3. The rate of flow of the filtrate is too low to carry these deposits to the outer wall during the filtrate flow. As a result, at the end of the filtration these particles lie unaltered in the position they have taken up.

When the disc filter elements are rotated for the purpose of removing the filter cake these particles, which lie between the bottom plate 3 and the filter mesh 5, are thrown toward the outer sealing edge of the rotary disc filter element and drop into the coaxial corrugation or groove 11. There they are raised by the flushing back fluid flowing in through the radial corrugations 10 and flow free. Thereafter, rinsing in the direction of filtration, which takes place at a multiple of the rate of flow of the filtration, the loosened filtering aid particles are caught up and passed out of the interior of the rotary disc filter elements. The slope in the radial corrugations 10 aids this effect.

In rotary disc filter elements without the corrugations 10 and 11 according to the invention these "deposits" could not be removed from the rotary disc filter elements, which first had to be removed from the tank, without mechanical assistance, e.g., by spraying out with a "steam jet." In the apparatus according to the prior art these particles became evenly fixed on the outer sealing edge between the bottom plate 3 and the filter mesh 5 and wedged together and this led increasingly to a bulge-like raising of the filter mesh 5 in the whole edge region.

Not only is the clamped filter mesh stretched resulting in a structural alteration in the trough channels in the mesh but also the effective filter surface is considerably reduced thereby. This phenomenon also leads to biological problems.

The rotary disc filter elements can run completely empty as a result of the inclination of the radial corrugations 10 towards the collecting channel 13. This is of particular importance in relevant methods and with expensive filtrates.

Because of the variability of the unobstructed height between two rotary disc filter elements arranged one above the other the filling space 16 can be altered and can therefore be adapted to the differing residue yield. This possibility does not exist in the apparatus according to the prior art because the height of the supporting feet is not adjustable, but by simple conversion of the filters it can be used for the filtration of different filter mediums.

We claim:

1. In a rotary disc filter assembly for a tank having an elongate, upright shaft extending therethrough and a plurality of rotary disc filter elements arranged in vertically stacked relation on said shaft, each of said filter elements having a circular bottom plate, a hub fixed to said bottom plate at its center, a supporting mesh carried by and overlying said bottom plate, a filter mesh overlying said supporting mesh, and means clamping said meshes to said bottom plate at the periphery thereof, the improvement wherein said bottom plate is unsupported radially outwardly of its hub and is downwardly deformed to provide therein a plurality of radially extending, circumferentially spaced grooves inclined downwardly and radially inwardly, the hub of each of said filter elements having an axial length sufficiently greater than the axial depth of any of said grooves whereby, when said filter elements are in stacked relation on said shaft and the hubs of adjacent filter elements are in engagement, a radially unobstructed axial space exists between the filter mesh of each filter element and the adjacent upper filter element.

2. A rotary disc filter element according to claim 1, wherein each of said grooves is upwardly open.

3. A rotary disc filter element according to claim 1 wherein the bottom plate is deformed in the region of the hub to form a generally cylindrical marginal inner edge.

4. A rotary disc filter element according to claim 1 wherein at least one downwardly extending groove coaxial with said hub is formed in said bottom plate adjacent its outer periphery.

5. A rotary disc filter element according to claim 4 wherein said radial grooves in said plate extend from its inner marginal edge to the coaxial groove.

6. A rotary disc filter element according to claim 1 wherein the circumferential spacing between said radial grooves is uniform.

7. A rotary disc filter element according to claim 6 wherein the circumferential spacing is between about 15 degrees and 60 degrees.

8. A rotary disc filter element according to claim 6 wherein the circumferential spacing is about 30 degrees.

9. A rotary disc filter element according to claim 1 wherein the hub has radially extending drainage bores therein.

10. A rotary disc filter element according to claim 1 wherein the upper surface of said bottom plate, when mounted on said shaft, is substantially horizontal.

11. A rotary disc filter element according to claim 1 wherein at its outer periphery the bottom plate has a step which forms a bearing surface for the supporting mesh.

12. A rotary disc filter element according to claim 11 wherein said step has a height corresponding to that of the supporting mesh.

* * * * *